United States Patent

[11] 3,614,071

| [72] | Inventor | James D. Brock<br>Chattanooga, Tenn. |
|---|---|---|
| [21] | Appl. No. | 41,145 |
| [22] | Filed | May 25, 1970 |
| [45] | Patented | Oct. 19, 1971 |
| [73] | Assignee | CMI Corporation<br>Oklahoma City, Okla. |

[54] ASPHALT PLANT DRYER-MIXER
15 Claims, 3 Drawing Figs.

[52] U.S. Cl................................................ 259/147,
259/3, 259/158
[51] Int. Cl............................................... B28c 5/06
[50] Field of Search......................................... 259/147,
148, 149, 151, 155, 156, 157, 158, 159, 164, 165,
3, 14, 30, 2

[56] References Cited
UNITED STATES PATENTS
| 1,240,481 | 9/1917 | Popkess...................... | 259/158 |
| 2,188,798 | 1/1940 | Smith........................... | 259/155 |

*Primary Examiner*—Robert W. Jenkins
*Attorney*—Jones & Thomas

ABSTRACT: An asphalt plant dryer-mixer is disclosed wherein the aggregate of the mix is delivered to the upper end of an inclined rotatable cylinder, a fan induces a flow of air through the cylinder from its upper end to its lower end, an open flame burner is positioned at the upper end to heat the air and aggregate, and a bituminous liquid spray device is positioned within the cylinder to apply the bituminous liquid to the aggregate within the cylinder and to spray the particles of dust and airborne debris from the aggregate with the bituminous liquid so that the dust and debris become a part of asphalt mix. Temperature sensors are positioned within the cylinder and are arranged to regulate the burner intensity and rate of aggregate input to the cylinder so that the aggregate is properly heated and dried before the bituminous liquid is applied to the aggregate.

INVENTOR
JAMES DONALD BROCK

BY Jones & Thomas
ATTORNEYS

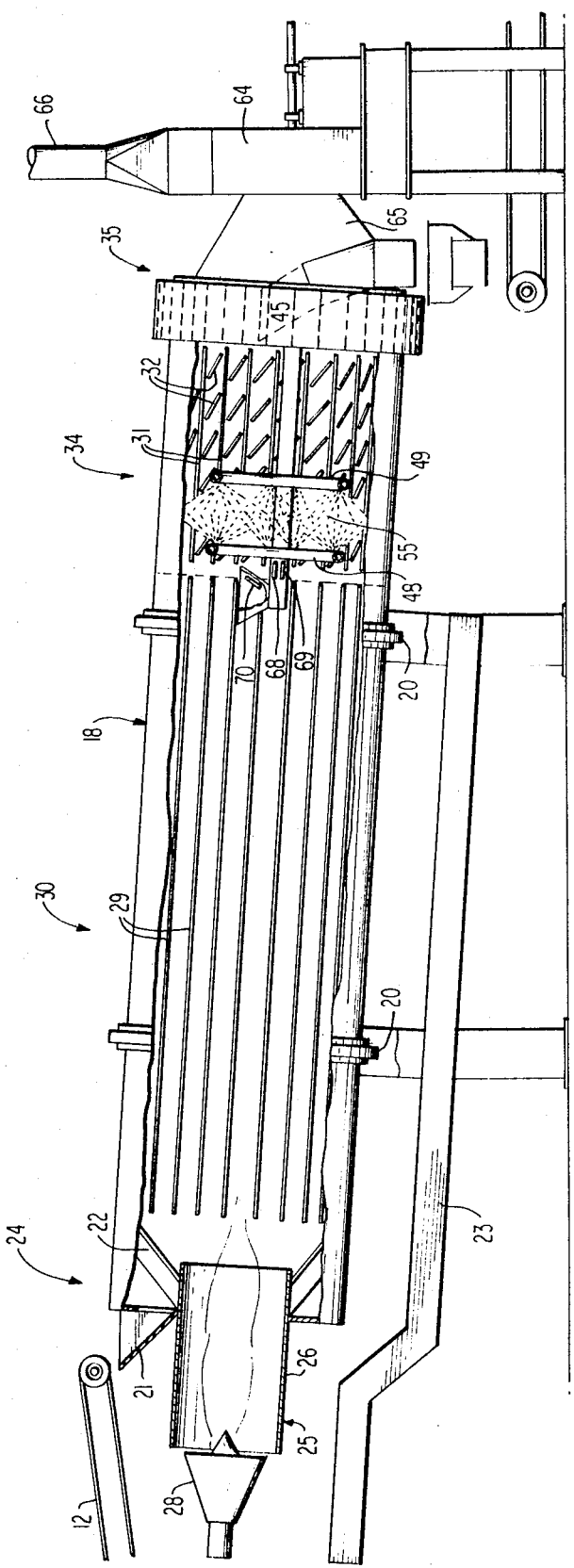

ASPHALT PLANT DRYER-MIXER

BACKGROUND OF THE INVENTION

In the preparation of asphalt for road surfaces or the like, it has been the custom to dry the aggregate or stone filler in a drying mechanism that usually comprises an inclined rotatable cylinder which tumbles the aggregate as it passes down the incline of the cylinder, and heated air is passed through the cylinder to heat the air and aggregate. When the aggregate emerges from the drying apparatus it is usually elevated to a tall structure where it is graded or sized and fed to a pug mill in batches where it is mixed by a plurality of paddles with a bituminous liquid to form the asphaltic mix. The batches of asphalt mix are subsequently fed to an elevated storage silo or dispensed directly to trucks for transporting to a road construction site. The structure of a typical asphalt mixing plant requires an expensive aggregate grading mechanism and pug mill mechanism at a high elevation so that the aggregate can be graded with the use of gravity and dispensed to the pug mill in a batch. Also, aggregate and bituminous liquid weighing devices, temperature controls, liquid conduits, and other necessary equipment are usually elevated in order to dispense the asphalt mix in a downward direction to a truck passing beneath the structure, which causes the structure to be expensive, nonmobile and difficult to manage.

In the process of forming an asphalt mix a large amount of dust and other airborne debris is usually created in the handling of the aggregate, especially at the aggregate dryer where the aggregate is vigorously tumbled and agitated. The dust from the aggregate is usually exhausted from the dryer with the drying air, and a significant portion of the dust is expelled to the atmosphere, as an air pollutant.

SUMMARY OF THE INVENTION

Briefly described, the present invention comprises an asphalt plant which includes a dryer-mixer positioned at a low elevation and which functions to dry the aggregate and add a bituminous liquid to the aggregate to form the asphalt mix at ground level. The mix is subsequently lifted to an elevated surge or storage system, such as an asphalt storage silo, for temporary storage where it can be conveniently dispensed to trucks for transporting to a construction site. The mixer-dryer comprises an inclined rotatable cylinder arranged to receive aggregate of a predetermined size or mixture of sizes at its upper end and a fan which induces a flow of air through the cylinder from its upper end to its lower end. An open flame burner is positioned at the upper end of the cylinder and functions to heat the air and aggregate flowing through the cylinder. A spray mechanism extends into the cylinder from its lower end and is arranged to spray the bituminous liquid onto the aggregate passing through the cylinder. The spray mechanism is arranged to form a fine spray or mist across the internal cross section of the cylinder so that not only the aggregate but any dust or other airborne debris flowing with the air through the cylinder will be coated with the bituminous liquid and fall with the bituminous liquid into the aggregate, so as to become a part of the asphalt mix. By the time the asphalt mix reaches the lower end of the cylinder, it is ready for loading onto a truck for delivery to a construction site or for delivery to a temporary storage container.

Thus, it is an object of this invention to provide an asphalt mixing plant which mixes the dust and other airborne debris from the aggregate dryer with the bituminous liquid so that the dust and other airborne debris are not expelled to the atmosphere.

Another object of this invention is to provide an asphalt plant wherein the aggregate for the asphalt mix is dried and the bituminous liquid is added to the aggregate in a single rotatable cylinder at ground level.

Another object of this invention is to provide a system for continuously forming asphalt mix wherein the hazard of expelling dust to the atmosphere is reduced by combining the dust with the mix.

Another object of this invention is to provide an asphalt plant dryer-mixer that is inexpensive to construct, maintain and operate, which is portable and easy to erect for operation or disassemble for transportation, and which can be utilized with other existing asphalt plant equipment.

Other objects, features and advantages of the present invention will become apparent upon reading the following specification when taken into conjunction with the accompanying drawing.

BRIEF DESCRIPTION OF THE DRAWING

FIG. 2 is a schematic side cross-sectional view of the dryer-mixer.

DESCRIPTION OF THE PREFERRED EMBODIMENT

Figure 1:
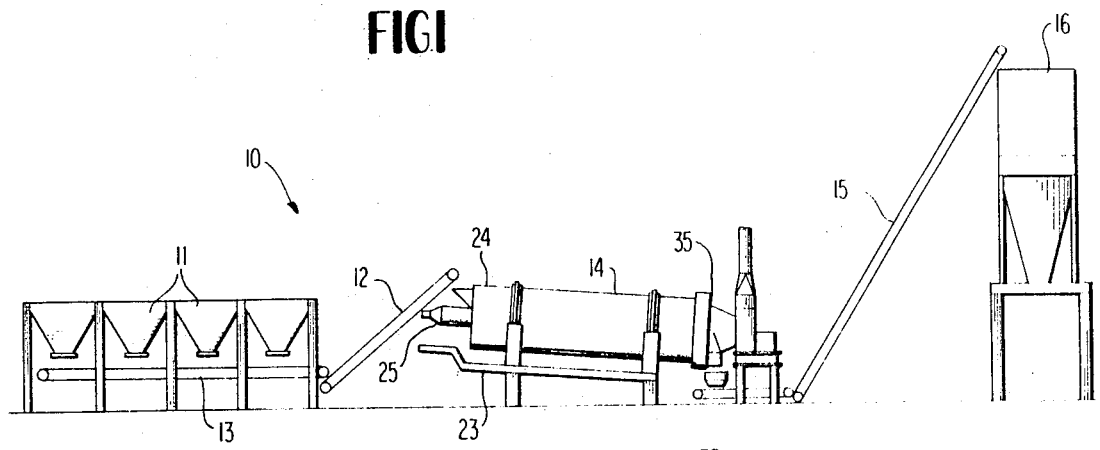
FIG. 1 is a schematic side view of the asphalt plant.

Referring now in more detail to the drawing, in which like numerals indicate like parts throughout the several views, FIG. 1 shows asphalt plant 10 which includes a plurality of aggregate feeder bins 11, conveyor 12, dryer-mixer 14, elevator 15 and surge silo 16. Aggregate feeder bins 11 are filled with sized aggregate, and small conveyors 13 at the bottom of each bin control the flow of aggregate to large conveyor 12. The size of the aggregate being delivered to dryer-mixer 14 is controlled by the outfeed of the various feeder bins 11; that is, when a small aggregate size is desired, the feeder bin having the smaller aggregate particle size will be operated to deposit its aggregate on the conveyor 12. If a mix of small and large aggregate particle size is desired, two or more of the feeder bins 11 can be operated simultaneously to deliver the aggregate to conveyor 12 and the conveyor will function to deliver the aggregate to the dryer-mixer 14.

As is best shown in FIG. 2, dryer-mixer 14 comprises an open ended drying and mixing cylinder 18 supported by a plurality of external roller rings 20 on the cylinder. Driving means (not shown) causes the cylinder 18 to rotate on its longitudinal axis.

Cylinder 18 is supported by mobile framework 23. The framework is arranged so that the cylinder 18 can be transported in a substantially horizontal attitude and the framework can be tilted to place cylinder 18 in an inclined attitude. Conveyor 12 functions to deliver the sized aggregate to inlet chute or pan 21 which guides the aggregate down into the cylinder 18. A plurality of inlet vanes 22 are positioned at the upper end or inlet end 24 and are angled with the direction of rotation of cylinder 18 so as to induce the aggregate to flow into the cylinder. Burner 25 includes a cylindrical burner can or shield 26 which is positioned with its longitudinal axis parallel to the longitudinal axis of cylinder 18 and protrudes into the upper end of the cylinder. Burner head 28 is positioned at the outer end of burner can 26 and creates an open flame within the burner can which s directed toward cylinder 18.

While inlet vanes 22 at the upper end of inlet end 24 of the cylinder are arranged to induce the aggregate to enter the cylinder, drying vanes 29 are located in drying zone 30, and the combination of lifting and mixing vanes 31 and 32 are located in mixing zone 34 at the lower or outlet end 35 of cylinder 18. Also, an enlarged diameter lifting ring 36 is connected to the outlet end 35 of cylinder 18 and includes inwardly extending lifting vanes 38. Drying vanes 29 of drying zone 30 and lifting vanes 31 of mixing zone 34 are substantially identical in shape and include elongated channel members with inwardly extending webs 39 and inner legs 40 extending from webs 39 in the direction of rotation 41 of cylinder 18. Mixing vanes 42 in mixing zone 34 are angled in the direction of the rotation of the cylinder 18 so as to inhibit the flow of the asphalt mix down the incline of cylinder 18, so that a substantial amount of mixing occurs in mixing zone 34. Lifting vanes 38 of lifting ring 36 are inwardly extending vanes which lift the asphalt mix to a high elevation before dropping the mix into an exhaust chute or hot mix outlet 44 positioned to receive the falling hot mix and guide the hot mix to the entrance of elevator 15.

Figure 3:
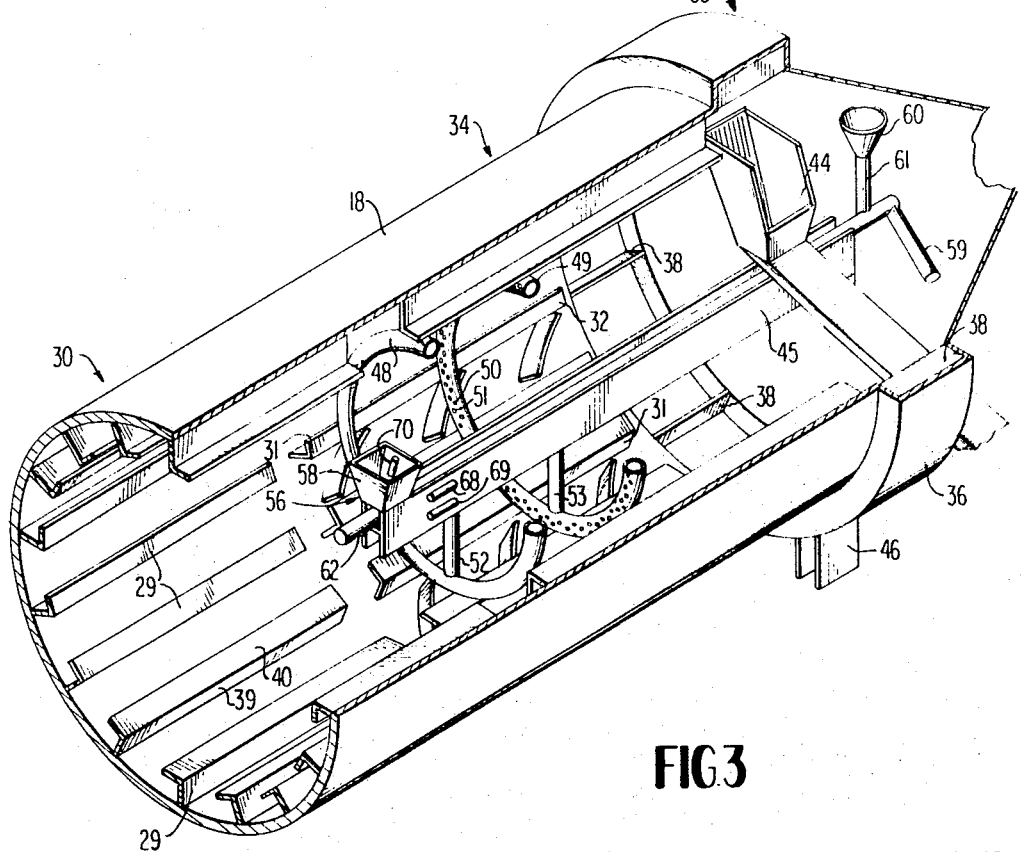
FIG. 3 is a perspective view of the dryer-mixer, with parts broken away to show the inside components.

As illustrated in FIG. 3, a rectilinear support beam 45 which is H-shaped in cross section extends into cylinder 18 from its lower or outlet end 35. Support beam 45 is supported as a cantilever by upright support beam 46 from outside cylinder 18. H-shaped support beam 45 is oriented so that its center web is horizontal and its end flanges are vertical. A pair of spray rings 48 and 49 are positioned in cylinder 18 at the beginning of mixing zone 34 and surround support beam 45. Spray rings 48 and 49 are annular rings, and each defines a plurality of spaced openings 50 extending generally toward the walls of cylinder 18 and toward the opposite spray ring and the second series of spaced openings 51 extending toward the axis of rotation of the cylinder and toward the opposite spray ring. Connecting pipes 52 and 53 are connected to the lower portions of spray rings 48 and 49 and extend toward the center web of support beam 45. A supply conduit (not shown) communicates with connecting pipes 52 and 53 at their upper ends and is received in and extends along the length of the lower recess of H-shaped support beam 45. The supply conduit extends out the outlet end 35 of cylinder 18 and communicates with a source of supply of hot bituminous liquid (not shown). When the source of supply of hot bituminous liquid communicates with spray rings 48 and 49, the openings 50 and 51 of the spray rings cause a spray or mist 55 to be created within the cylinder 18 in the mixing zone 34, so that virtually the entire cross-sectional area of cylinder 18 in the vicinity of the spray rings is occupied by a spray or mist 55 of hot bituminous liquid.

The upper recess of H-shaped support beam 45 is occupied by auger conveyor 56 which extends along the length of the support beam. A sampling hopper 58 communicates with conveyor 56 at the inner end of support beam 45, and discharge chute 59 extends in a downward direction from conveyor 56 at a point beyond the outlet end 35 of cylinder 18. A second hopper 60 is positioned above conveyor 56 beyond the outlet end 35 of cylinder 18 and its inclined conduit 61 communicates with conveyor 56 so that material can be fed to the conveyor from outside cylinder 18. Discharge opening 62 is positioned within cylinder 18 at the inner end of support beam 45. With this arrangement, the auger (not shown) of conveyor 56 can be rotated in one direction to flow material from sampling hopper 58 along the length of the conveyor to the discharge chute 59, or the auger can be rotated in the opposite direction to flow material from hopper 60 and conduit 61 along the length of the conveyor to discharge opening 62.

Exhaust blower 64 is mounted on mobile frame 23 and includes a hood or breeching 65 which registers with the outlet or lower end 35 of cylinder 18 and an exhaust stack 66 which extends in an upward direction. The arrangement is such that blower 64 induces a flow of air through dryer-mixer 14, from the upper or inlet end 24 to the lower or outlet end 35. Hot mix exhaust chute 44 extends through hood 65 and is angled inwardly toward the upper portion of lifting ring 36 to receive the falling mix. Also, the upright beam 46 extends through hood 65 and is connected to other supporting framework (not shown) to maintain support beam 45 within cylinder 18. The sloped conduits 59 and 61 of conveyor 56 also extend through hood 65.

Elevator 15 is a drag conveyor and functions to convey the asphalt mix from hot mix exhaust chute 44 of dryer-mixer 14 to the upper end of surge silo 16.

As is illustrated in FIG. 3, a pair of temperature probes 68 and 69 are mounted within cylinder 18 at a position upstream of spray rings 48 and 49. Temperature probe 68 is a quick response or fast acting temperature sensor, while temperature probe 69 is slower to respond to temperature changes. Temperature probes 68 and 69 are arranged to sense or determine the air temperature within cylinder 18. A third temperature probe 70 is positioned so as to be in contact with the aggregate within cylinder 18 as the aggregate leaves drying zone 30 and enters mixing zone 34. In the specific embodiment shown, aggregate temperature probe 70 is located on an inner wall of sampling hopper 58.

Temperature probes 68, 69 and 70 are electrically connected to a control mechanism (not shown) to regulate burner 25 and conveyors 12 and 13, to control the intensity of the flame of burner 25 and the rate of infeed of aggregate from feeder bins 11. The temperature probes generally separate the drying zone 30 from the mixing zone 34 so that under ideal conditions the aggregate flowing through drying zone 30 will be at the right temperature level and will be completely dry and will accept the application of bituminous liquid when it reaches the end of drying zone 30. If the aggregate is properly prepared long before reaching the end of drying zone 30, the burner flame is too intense and asphalt plant 10 will not be operating at optimum efficiency, or if the aggregate has not been dried or has not reached the proper temperature level before it enters mixing zone 34, the bituminous liquid will not cling to the aggregate or will tend to strip off the aggregate.

OPERATION

When dryer-mixer 14 is to be connected to an asphalt plant, its mobile frame 23 is placed in position and tilted to incline cylinder 18. The degree of incline of the cylinder generally controls the speed with which the aggregate will travel through the dryer-mixer for a given rotational speed of the cylinder. Under normal circumstances, the cylinder 18 will be inclined at an angle of between 2 ½° and 7° from the horizontal, which is sufficient to move the aggregate from the upper inlet end to the lower outlet end, and to retain the aggregate within the cylinder for the length of time sufficient to properly dry the aggregate in drying zone 30 before it reaches the mixing zone 34.

When the operation of the plant is begun the sized aggregate is fed from feeder bins 11 on conveyors 12 and 13 to inlet chute 21, where the aggregate first enters the inlet end 24 of cylinder 18. When the aggregate engages inlet vanes 22, it is urged on into drying zone 30 beyond the burner can 26 of burner 25. Burner 25 creates an open flame that is surrounded by burner can 26 and provides intense heat inside cylinder 18 in drying zone 30. Exhaust blower 64 induces a flow of air from inlet end 24 of the cylinder to the lower outlet end 35, through hood 65 and up exhaust stack 66. This tends to confine the heat from burner 25 primarily within cylinder 18.

Spray rings 49 and 50 within cylinder 18 function to flow bituminous liquid into mixing zone 34 at a high velocity so that a fine spray or mist 55 is created across the entire cross section of cylinder 18 in the vicinity of the spray rings. Since openings 50 and 51 of spray rings 49 and 50 extend both inwardly and outwardly of the spray rings there will be virtually no open space in the vicinity of the spray rings that is not occupied with a spray of bituminous liquid. Moreover, as the spray disperses within mixing zone 34, it settles within mixing zone 34 as it moves with the flow of air through the cylinder toward outlet end 35.

As the aggregate first enters cylinder 18 and subsequently passes through drying zone 30, it is vigorously tumbled and mixed within the drying zone and a large amount of dust and other airborne debris is created. Since all of the dust must pass through mixing zone 34, it is virtually all coated with bituminous liquid from spray rings 49 and 50, which causes substantially all of the dust to be coated with the bituminous liquid and fall to the mass of aggregate flowing along cylinder 18. Also, as the aggregate passes through cylinder 34, each aggregate particle has its entire surface exposed to the bituminous liquid so as to be completely coated with the bituminous liquid due to the tumbling within the cylinder, engagement with the inner walls of the cylinder which are continuously coated with the bituminous liquid, and by repeated and rapid engagement with other previously coated aggregate particles. By the time the aggregate reaches lifting ring 36 at the lower outlet end of cylinder 18, each aggregate particle is properly coated with the bituminous liquid. Moreover, the airborne dust from the drying zone 30 will have been drawn into the bituminous mist so that it settles into the aggregate and becomes a part of the asphalt mix. Thus, the airborne dust is actually combined with the asphalt mix.

In order to positively control the quality of the asphalt mix obtained from dryer-mixer 14, temperature probes 68 and 69 sense the temperature of the air in cylinder 18 and regulate the intensity of the flame from burner 25, and the speed of operation of conveyors 12 and 13. Temperature probe 70 determines the temperature of the aggregate at the end of drying zone 30 and also functions to regulate the burner and conveyors. Thus, optimum efficiency of the drying zone 30 can be achieved for various atmospheric and aggregate conditions.

In order to sample the gradation of the aggregate at the end of drying zone 30, auger conveyor can be operated to retrieve aggregate samples as desired, so that fine adjustments can be made to the system in response to actually handling the aggregate samples. Of course, after the dryer-mixer has been initially adjusted to provide the proper asphalt mix consistency, the operation of auger conveyor 56 can be terminated if desired since the operating conditions of the dryer-mixer are not likely to vary to any substantial extent after the operation thereof has been initiated. Moreover, auger conveyor 56 can be reversed so that a mineral filler or other additive can be delivered to the aggregate at the end of drying zone 30.

Since the operation of dryer-mixer 14 is of a continuous nature as opposed to the batch pug mill system, the operation of the dryer-mixer 14 will usually be a continuous operation; that is, a flow of aggregate from feeder bins 11 will be initiated and continue and the other components of the system will be initiated and will be allowed to continue until one or more of the surge silos have been completely filled or until the source of aggregate from the feeder bins has been depleted. With this arrangement, the consistency of the asphalt produced by the system can be closely inspected as the operation of the system is initiated, and the system can continue to operate with only a token amount of attention and the consistency of the asphalt produced is prone to remain constant.

It will be noted that the air drawn into the inlet end 24 of cylinder 18 is used to support the combustion taking place in burner 25, so that the gases flowing through cylinder 18 are generally inert. This results in low oxidation of the asphalt mix in mixing zone 34 so that a softer mix is created and delivered to the storage silo 16. The softer asphalt mix has good compacting characteristics which enables the contractor to form a high quality road surface with the mix.

While this invention has been described in detail with particular reference to preferred embodiments thereof, it will be understood that variations and modifications can be effected within the spirit and scope of the invention as described hereinbefore and as defined in the appended claims.

I claim:

1. Apparatus for making an asphalt mix comprising a mixing cylinder positioned with its longitudinal axis at an incline, means for rotating said mixing cylinder about its longitudinal axis, aggregate feed means positioned at the upper end of said mixing cylinder for feeding aggregate to said mixing cylinder, a plurality of aggregate lifting vanes attached to said mixing cylinder and arranged to lift the aggregate along the side of the mixing cylinder and drop the aggregate across the mixing cylinder during the rotation of the mixing cylinder, heating means positioned at the upper end of said mixing cylinder for heating the aggregate fed to said mixing cylinder, air flow means positioned at the lower end of said mixing cylinder and arranged to flow air through said mixing cylinder from its upper end toward its lower end, bituminous spray means for spraying bituminous liquid into said mixing cylinder at a position intermediate the ends of said mixing cylinder, and control means upstream of said bituminous spray means for regulating said heating means in response to the temperature of the aggregate.

2. The apparatus of claim 1 and wherein said aggregate feed means comprises a plurality of aggregate storage bins for storing and dispensing sized aggregates, and conveyor means extending between said aggregate storage bins and the upper end of said mixing cylinder.

3. The apparatus of claim 1 and wherein said heating means comprises an open flame burner arranged to project a flame into the upper end of said mixing cylinder 4. The apparatus of claim 1 and wherein said bituminous spray means comprises a plurality of spray nozzles positioned within said mixing cylinder and arranged to substantially fill said mixing cylinder in the vicinity of said spray nozzles with a bituminous mist.

5. The apparatus of claim 1 and wherein said bituminous spray means comprises a plurality of stationary spray nozzles positioned within said mixing cylinder and supported from outside said mixing cylinder.

6. In a plant for preparing asphalt mix from an aggregate and bituminous liquid, the improvement comprising a generally cylindrical open-ended aggregate dryer-mixer disposed with its longitudinal axis on an incline, driving means for rotating said dryer-mixer about its longitudinal axis, means for flowing aggregate into the upper end of said dryer-mixer, a plurality of aggregate lifting vanes attached to the inside surface of said dryer-mixer and arranged to lift the aggregate with the rotation of the dryer-mixer and drop the aggregate across the dryer-mixer, airflow means communicating with the lower end of said dryer-mixer and arranged to draw air through said dryer-mixer, heating means for heating the air flowing through said dryer-mixer, and spray means arranged to form a spray of hot bituminous liquid in the lower portion of said dryer-mixer, whereby the aggregate tumbles freely through the dryer-mixer, the aggregate is heated and dried in the upper portion of the dryer-mixer, and the aggregate and dust in the dryer-mixer are coated with hot bituminous liquid by the spray means in the lower portion of said dryer-mixer.

7. The invention of claim 6 and further comprising temperature sensing means positioned inside said dryer-mixer upstream of the spray of hot bituminous liquid constructed and arranged to regulate said heating means.

8. The invention of claim 6 and wherein said spray means comprises a stationary conduit extending into the lower end of said dryer-mixer and nozzles communicating with said conduit for forming a spray in said dryer-mixer.

9. The plant of claim 6 and further including means for retrieving aggregate from said cylinder at the vicinity of said temperature sensing means.

10. The plant of claim 6 and further including reversible conveyor means extending into said cylinder from its lower end for retrieving aggregate from said cylinder or for inserting a substance into said cylinder.

11. A method of preparing an asphalt mix comprising flowing aggregate into the upper end of an inclined rotatable cylinder, rotating the cylinder about its longitudinal centerline so as to tumble the aggregate in the cylinder across the cylinder and progressively down the length of the cylinder and to separate any dust carried by the aggregate from the aggregate, flowing air through the cylinder from its upper end toward its lower end to carry the dust along the length of the cylinder, heating the air and aggregate at the upper end of the cylinder, sensing the temperature of the air and aggregate at a position intermediate the ends of the cylinder, regulating the heating of the air and aggregate in response to the temperature of the aggregate at a position intermediate the ends of the cylinder, and applying a bituminous liquid to the aggregate tumbling through the cylinder and to the dust flowing through the cylinder at a position downstream from the position where the temperature of the aggregate is sensed.

12. A method of preparing an asphalt mix comprising flowing dust laden aggregate into the upper end of an inclined cylinder rotatable about its longitudinal axis, rotating the cylinder to tumble the aggregate across the cylinder and progressively down the length of the cylinder to jar the dust from the aggregate, flowing heated air down the length of the cylinder to dry the tumbling aggregate and to carry the dust toward the lower end of the cylinder, and spraying a bituminous liquid into the lower end of the cylinder to coat the aggregate tumbling through the cylinder and to coat the dust flowing with the air through the cylinder.

13. The method of claim 12 and further including the step of adding a substance to the aggregate intermediate the ends of the cylinder upstream of the position in the cylinder where the bituminous liquid is sprayed.

14. The method of claim 12 and further including the step of retrieving a sample of the aggregate from a position intermediate the ends of said cylinder.

15. A plant for preparing asphalt mix or the like comprising an inclined rotatable cylinder, means for feeding aggregate to the upper end of said cylinder, means at the upper end of said cylinder for heating the aggregate in the cylinder, means for mixing hot bituminous liquid with the heated aggregate in the lower portion of said cylinder, means for flowing air down the length of said cylinder, and reversible conveyor means extending into said cylinder for retrieving aggregate from said cylinder or for inserting a substance into said cylinder.